United States Patent [19]

Greenfield, deceased et al.

[11] Patent Number: 5,076,895

[45] Date of Patent: Dec. 31, 1991

[54] PROCESS AND APPARATUS FOR RECOVERING CLEAN WATER AND SOLIDS FROM AQUEOUS SOLIDS USING MECHANICAL VAPOR RECOMPRESSION EVAPORATORS

[75] Inventors: Charles Greenfield, deceased, late of Murray Hill, N.J., by Jacqueline Greenfield, executrix; Robert E. Casparian, Dry Fork, Va.

[73] Assignee: Hanover Research Corporation, East Hanover, N.J.

[21] Appl. No.: 541,765

[22] Filed: Jun. 21, 1990

[51] Int. Cl.$^5$ .......................... B01D 1/28; C02F 1/04

[52] U.S. Cl. ....................................... 203/10; 203/21; 203/22; 203/26; 203/39; 203/47; 203/73; 203/100; 203/DIG. 8; 203/DIG. 25; 159/24.1; 159/29; 159/46; 159/47.3; 159/DIG. 25; 202/173; 202/176; 202/177; 202/182; 202/204

[58] Field of Search ..................... 203/10, 11, 21, 22, 203/24, 39, 26, 47, 71, 100, 73, DIG. 17, DIG. 25, DIG. 8; 202/182, 173, 174, 176, 177, 204; 159/24.1, 24.2, 17.1, 16.3, 47.1, 47.3, 905, 46, DIG. 25, DIG. 10, DIG. 11, DIG. 33, 29

[56] References Cited

U.S. PATENT DOCUMENTS

| | | |
|---|---|---|
| Re. 26,317 | 12/1967 | Greenfield . |
| Re. 31,185 | 3/1983 | Greenfield et al. . |
| 2,280,093 | 4/1942 | Kleinschmidt . |
| 2,487,884 | 11/1949 | Lunt . |
| 2,537,259 | 1/1951 | Cleaver et al. . |
| 2,589,406 | 3/1952 | Latham, Jr. . |
| 2,619,453 | 11/1952 | Anderson . |
| 2,885,328 | 5/1959 | Williamson . |
| 2,942,657 | 6/1960 | Kleinschmidt . |
| 2,999,795 | 9/1961 | Yagi et al. ............................... 203/22 |
| 3,298,932 | 1/1967 | Bauer ...................................... 203/26 |
| 3,348,599 | 10/1967 | Lohstoeter et al. ................ 159/905 |
| 3,409,067 | 11/1968 | Dunklin et al. . |
| 3,411,992 | 11/1968 | Mitchell ................................. 203/26 |
| 3,483,093 | 12/1969 | Walker et al. ....................... 203/100 |
| 3,489,654 | 1/1970 | Geiringer . |
| 3,514,375 | 5/1970 | Dambrine . |
| 3,716,458 | 2/1973 | Greenfield . |
| 3,741,878 | 6/1973 | Osdor . |
| 3,788,954 | 1/1974 | Cantrell ................................. 203/26 |
| 3,855,079 | 12/1974 | Greenfield et al. . |
| 3,917,508 | 11/1975 | Greenfield et al. . |
| 3,947,327 | 3/1976 | Greenfield et al. . |
| 3,950,230 | 4/1976 | Greenfield et al. . |
| 3,997,388 | 12/1976 | Simon ................................... 159/905 |
| 4,013,516 | 3/1977 | Greenfield et al. . |
| 4,097,378 | 6/1978 | St. Clair .............................. 159/905 |
| 4,270,974 | 6/1981 | Greenfield et al. . |
| 4,303,468 | 12/1981 | Laguiharre et al. . |
| 4,343,678 | 8/1982 | Franzen . |
| 4,379,734 | 4/1983 | Franzen . |
| 4,420,373 | 12/1983 | Egosi . |
| 4,495,212 | 1/1985 | Ciboit . |
| 4,518,458 | 5/1985 | Greenfield et al. . |
| 4,687,546 | 8/1987 | Willis . |
| 4,702,798 | 10/1987 | Bonanno . |

OTHER PUBLICATIONS

"Development of an Efficient Biomass Drying Process and Its Commercial Use for Energy Recovery" by Clifton James Crumm II, ("Crumm Article").

"Benefits From Biowaste" by Sam Walters, Associate Editor, *Mechanical Engineering*, Apr. 1985, pp. 70-75 ("Walters Article").

*Primary Examiner*—Wilbur Bascomb, Jr.
*Attorney, Agent, or Firm*—Richard L. Cannaday; Edwin T. Yates; Frank J. DeRosa

[57] ABSTRACT

Process and apparatus for recovering clean water and solids from aqueous solids are disclosed. Aqueous solids are mixed with a low viscosity, relatively volatile, water-immiscible light fluidizing oil to obtain a mixture which will remain fluid and pumpable after removal of essentially its entire water content. The mixture of solids, water and fluidizing oil is subjected to a dehydration step by means of a plurality of mechanical vapor recompression evaporators operating in staged array whereby substantially all of the water and at least part of the light oil are evaporated and subsequently recovered. The light fluidizing oil is then largely separated from the solids. Residual fluidizing oil may be removed from the solids by direct contact with a hot blowing gas such as blowing steam. The invention is characterized by the conservation of energy through the use of heat exchangers whereby condensate gives up its heat to the feed.

15 Claims, 2 Drawing Sheets

PROCESS AND APPARATUS FOR RECOVERING CLEAN WATER AND SOLIDS FROM AQUEOUS SOLIDS USING MECHANICAL VAPOR RECOMPRESSION EVAPORATORS

BACKGROUND OF THE INVENTION

The economic disposal of waste solids and recovery of clean water from aqueous solutions and dispersions thereof is a recognized problem. Also, the need to recover clean water and valuable solid materials from aqueous solutions and dispersions thereof is a common occurrence. Ideally, apparatuses and processes for the recovery of water from aqueous solids should provide ease of disposition of all constituents, avoidance of pollution, economic operation and hygienic handling, and should, in addition, yield clean water. Furthermore, in the course of recovering clean water it is desirable to obtain by-products, both solid and liquid, which are valuable in themselves or can be utilized to further the economics of the process. For purposes of this invention it is to be understood that the term "aqueous solids" is employed generically to include suspensions, dispersions, solutions, mixtures and other forms of fluid association of solids in water.

In our U.S. Pat. No. 4,270,974 titled "Process and Apparatus for Recovering Clean Water and Solids from Aqueous Solids" are described process and apparatus whereby aqueous solids are mixed with a low viscosity, relatively volatile, water-immiscible light fluidizing oil to form a mixture which is dehydrated by heat evaporation. The dehydration step is accomplished in a plurality of sequential heat evaporation steps wherein each of the successive heat evaporation steps is at a successively higher temperature and the resulting solids streams are of successively higher concentration because of increasing dehydration, the evolved vapors of each evaporating step supplying a substantial portion of the heat requirement of the preceding heat evaporation step. Despite the use of a relatively efficient multiple stage heat evaporator, the energy requirements are substantial. For example, the energy usage of a four-stage heat evaporating system dehydrating a 15-20% solids input is typically around 400 BTU's per pound of water evaporated.

SUMMARY OF THE INVENTION

The process and apparatus of this invention comprise a series of steps and a systematic arrangement of equipment for recovering clean water and solids from aqueous solids. Aqueous solids are slurried with a low viscosity, relatively volatile, water-immiscible light fluidizing oil and the mixture subjected to dehydration using mechanical vapor recompression (MVR) evaporation whereby substantially all the water and part of the light fluidizing oil are vaporized. The mixed vapor is condensed and separated into a clean water fraction and a recovered light oil fraction. The resultant slurry of substantially anhydrous solids in light fluidizing oil is separated into an oil phase and a solids phase which is laden with residual light fluidizing oil. The separation of the oil phase and the solids phase may be carried out as a gravity separation or a pressing apparatus of either a static or a dynamic variety, or both, may be used. By using sequential single stage MVR evaporators and by using heat exchangers to supply heat from condensates to the feed, substantial economies can be achieved in the amount of heat needed to effect evaporation. Moreover, evaporation occurs at low temperatures, thereby reducing thermal damage to temperature sensitive solids products.

It is therefore an object of this invention to provide process and apparatus for the dehydration of aqueous solids in a light fluidizing oil medium with the expenditure of a relatively small amount of energy.

It is another object of this invention to provide process and apparatus for the recovery of clean water from aqueous solids dehydrated in a light fluidizing oil medium with the expenditure of only a relatively small amount of energy.

It is yet another object of this invention to provide process and apparatus for the recovery of substantially dry, fluidizing oil-free solids from aqueous solids dehydrated in a light fluidizing oil medium with the expenditure of only a relatively small amount of energy.

It is still another object of this invention to provide process and apparatus for the dehydration of aqueous solids in a light fluidizing oil medium at a relatively low temperature.

Yet another object of this invention is to provide process and apparatus for the dehydration of aqueous solids in a light fluidizing oil medium wherein water is evaporated by the use of direct mechanical energy.

The foregoing and other objects are accomplished by the practice of this invention. Broadly, viewed in one of its principal aspects, this invention consists of a process for the recovery of clean water and substantially dry, fluidizing oil-free solids from aqueous solids dehydrated in a light fluidizing oil medium, said process comprising steps as follows:

1. Admixing aqueous solids with a low viscosity, relatively volatile, water-immiscible light fluidizing oil to obtain a mixture which will remain fluid and pumpable after removal of the water content therefrom;
2. Subjecting the resultant oil-containing mixture to dehydration by means of a plurality of mechanical vapor recompression evaporators operating in staged array comprising at least a first stage and a last stage whereby part of the water and part of the light fluidizing oil are vaporized in the first stage and substantially all the water and part of the light fluidizing oil are vaporized by the last stage, yielding a mixed water and light oil vapor and a substantially anhydrous solids in oil slurry;
3. Condensing the resultant mixed water and light oil vapors to form a hot mixed condensate;
4. Separating the resultant hot mixed condensate into a hot clean water fraction and a hot light oil fraction, and
5. Separating the relatively volatile, water-immiscible light fluidizing oil from said substantially anhydrous solids in oil slurry.

The foregoing process is carried out in an apparatus for recovering clean water and substantially dry, fluidizing oil-free solids from aqueous solids dehydrated in a light fluidizing oil medium, said apparatus comprising a systematic arrangement of equipment as follows:

1. A conveyor, including a heat exchanger, for aqueous solids;
2. A light fluidizing oil reservoir;
3. Means for transmitting light fluidizing oil from said light fluidizing oil reservoir to the stream of aqueous solids discharged from said conveyor to form a mixture;

4. A blender;
5. Means for transmitting the mixture of light fluidizing oil and aqueous solids to said blender whereby said light fluidizing oil and said aqueous solids may become thoroughly mixed;
6. A plurality of mechanical vapor recompression evaporators operating in staged array comprising at least a first stage and a last stage;
7. Means for transmitting said stream of aqueous solids admixed with light fluidizing oil from said blender into the evaporating region of the first stage of said mechanical vapor recompression evaporator array whereby said aqueous solids become partially dehydrated;
8. Means, including a heat exchanger, for transmitting the partially dehydrated stream of aqueous solids in light fluidizing oil from the first stage of said mechanical vapor recompression evaporator array to the evaporating region of a later stage of the mechanical vapor recompression evaporator array;
9. Means for transmitting at least a portion of hot light oil condensate and hot water condensate formed in said later stage of the mechanical vapor recompression evaporator array from said later stage of the mechanical vapor recompression evaporator array to the heat exchanger of said means for transmitting the partially dehydrated stream of aqueous solids in light fluidizing oil from the first stage of the mechanical vapor recompression evaporator array to the evaporating region of said later stage of the mechanical vapor recompression evaporator array whereby said partially dehydrated stream of aqueous solids in light fluidizing oil is heated further prior to transmittal to said later stage of the mechanical vapor recompression evaporator array;
10. An oil-water separating means;
11. Conduits extending from said mechanical vapor recompression evaporator array, and from the heat exchanger of said means for transmitting the partially dehydrated stream of aqueous solids in light fluidizing oil, to said oil-water separating means wherethrough may flow a mixed condensate of water and light oil;
12. Means for separately withdrawing light oil from said oil-water separating means;
13. Means for separately withdrawing hot clean water from said oil-water separating means and conducting it to the heat exchanger in the conveyor for aqueous solids to thereby raise the temperature of said aqueous solids;
14. A liquid-solid separating means;
15. A conduit extending from the last stage of said mechanical vapor recompression evaporator array to said liquid-solid separating means wherethrough may flow a stream of a slurry of substantially anhydrous solids in light fluidizing oil;
16. A deoiler means;
17. A conduit extending from said liquid-solid separating means to said deoiler means wherethrough may flow a stream of residually oil-laden substantially anhydrous solids, and
18. A combustion apparatus associated with said deoiler means for supplying at least a portion of evaporative heat thereto by indirect heat transfer, and blowing gas to come into direct contact with said residually oil-laden substantially anhydrous solids in said deoiler means.

The instant invention thus provides process and apparatus for recovering solids and clean water from aqueous solids dehydrated in a light fluidizing oil medium. The invention is characterized by the use of a plurality of sequential mechanical vapor recompression evaporators operating in staged array and by the conservation of energy through the use of heat exchangers whereby hot light oil and water condensates give up their heat to the feed to the mechanical vapor recompression evaporators. Aqueous solids are admixed with a low viscosity, relatively volatile, water-immiscible light fluidizing oil and the mixture subjected to a dehydration step by means of a plurality of mechanical vapor recompression evaporators operating in staged array to remove substantially all of the water and part of the light oil. The remainder of the light fluidizing oil is then largely separated from the solids. Residual fluidizing oil may be removed from the solids by direct contact with a blowing gas. When the blowing gas is steam, since the light oil is water-immiscible, its direct contact with blowing gas, i.e., steam, amounts essentially to a steam distillation wherein the light oil in the presence of the blowing gas boils at a temperature below its normal boiling point. Alternatively, the light fluidizing oil-laden solids may be brought into direct contact with a hot, inert blowing gas such as nitrogen, carbon dioxide or products of combustion as is disclosed in our U.S. Pat. No. 4,518,458.

The nature and substance of the present invention as well as its objects and advantages will be more clearly perceived and fully understood by referring to the following description and claims taken in connection with the accompanying drawing which is described briefly below.

DESCRIPTION OF THE PREFERRED EMBODIMENTS

Figure 1A:
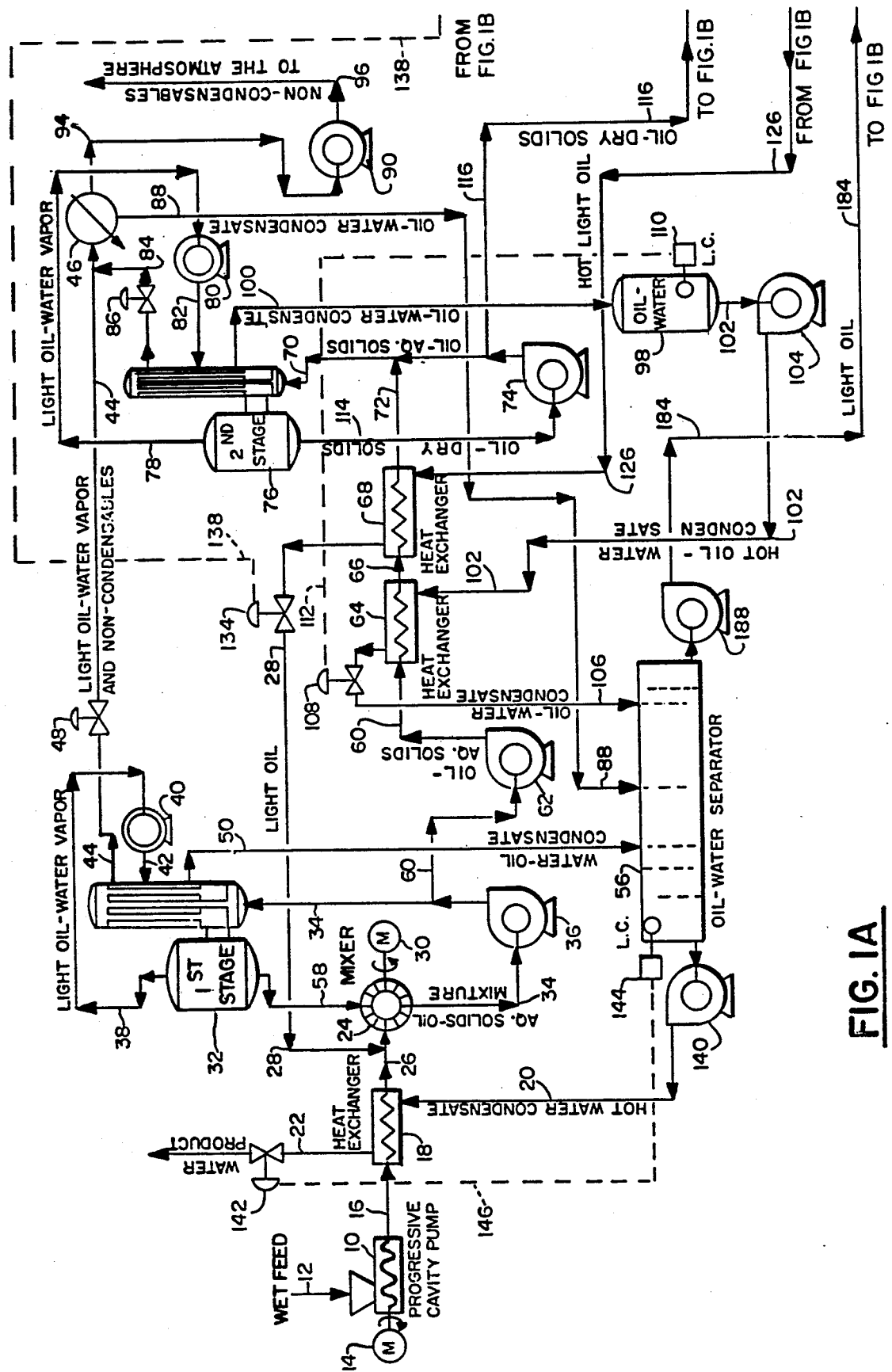
FIG. 1A and FIG. 1B illustrate the apparatus of the invention, broken into two parts, wherein a mixture of aqueous solids and light fluidizing oil is subjected to evaporation in a plurality of mechanical vapor recompression evaporators operating in staged array in a system characterized by the conservation of energy.

The clean water and solids recovery process of this invention as applied to aqueous solids is thus characterized by subjecting an aqueous solids-light fluidizing oil mixture to heat evaporation using a plurality of mechanical vapor recompression evaporators operating in staged array and by the conservation of energy through the use of heat exchangers whereby hot light oil and water condensates formed in the evaporation step give up their heat to the feed to the mechanical vapor recompression evaporator array. The process comprises mixing aqueous solids with a low viscosity, relatively volatile, water-immiscible light fluidizing oil to obtain a mixture which will remain fluid and pumpable after removal of essentially its entire water content, and thereafter subjecting the resulting mixture of solids, water and oil to a dehydration step by heat evaporation in a plurality of mechanical vapor recompression evaporators operating in staged array whereby substantially all of the water and at least part of the light fluidizing oil are evaporated and subsequently recovered. The vapors from the oil dehydration step are condensed and the hot condensate used to supply heat to the feed to the mechanical vapor recompression evaporator array. Following dehydration, the light oil is largely separated from the solids. Residual light fluidizing oil is removed from the solids by bringing the solids into direct contact with a hot inert blowing gas which may in part be blowing steam whereby the light oil is removed by heat evaporation.

In the case where light fluidizing oil-laden solids are directly contacted with blowing steam, not only may the blowing steam if it be superheated supply the latent heat for evaporation of the light oil but, since said light oil and water are immiscible and since it is a well-known scientific fact that any mixture of two immiscible liquids must boil at a temperature lower than the boiling point of the higher boiling liquid, it follows that the light fluidizing oil is evaporated from the solids at an appreciably lower temperature than if the gas were merely an extraneous heat source that did not come into direct contact with the light fluidizing oil-laden solids. On the other hand, the light oil-laden solids may be directly contacted with saturated blowing gas at atmospheric pressure and at a temperature of about 212° F., or indeed any gas or vapor or mixture of vapors at that temperature, provided heat for vaporization of the light oil is supplied by an external source such as via a heat jacketed device. Lower gas temperatures in the range of about 150° F. or less may be employed provided the gas is not saturated with the light oil being removed from the solids, and provided heat for vaporization of the light oil is supplied by an external source such as by a heat jacket. It will be understood that, as a result of the external heat, the solids will in every case be at a temperature in excess of the boiling point of water at that particular pressure.

By light fluidizing oil is meant an organic liquid that is water-immiscible and relatively fluid as well as relatively volatile. Thus, a relatively volatile fluidizing oil is mixed with the aqueous solids prior to the dehydration thereof. Dehydration by means of a mechanical vapor recompression evaporator array results in removal of substantially all of the water and part of the light fluidizing oil. The remainder of the light oil is largely separated from the solids, thereby leaving solids laden with residual light fluidizing oil. In the case where the light oil-laden solids are deoiled by direct contact with blowing steam, light oils that otherwise boil too high when heated by an extraneous source, e.g., about 150°-550° F., can be used as the fluidizing oil in the dehydration step. The direct contacting of the light fluidizing oil-laden solids with blowing steam amounts, in effect, to steam distillation wherein light oils that otherwise boil in the range of from about 150° F. to about 550° F. are distilled at temperatures within the range of from about 70° F. to about 400° F.

In the practice of this invention, the essentially anhydrous slurry of solids in light fluidizing oil is separated to recover the oil and the solids in a largely dry condition but containing sorbed light fluidizing oil. This may be accomplished by gravity or by mechanical pressure of either a static or a dynamic variety, or both, on the anhydrous slurry whereby the greater part of the oil is separated from the solids. In some cases, as in the processing of food products, sewage sludge, rendering raw materials, or slaughter house wastes, the material itself contains an appreciable amount of oil independently of light fluidizing oil which may be added to it prior to the dehydration step. If this oil is a light oil, it essentially becomes part of the light fluidizing oil and will be either evaporated during dehydration and subsequently recovered or carried through the dehydration step along with the solids and the major part of the added fluidizing oil and be subjected to being separated from the dehydrated slurry along with the added oil. If the essentially water-free slurry be subjected to a sufficiently efficient separation, it may thus be made to yield oil in a quantity or at a rate equal to or in excess of that in or at which oil was previously added to the aqueous solids. If the oil associated with the aqueous solids is a heavy, relatively non-volatile oil, it may in effect be extracted from the essentially dry solids by the light fluidizing oil during the separation step, e.g., a pressing operation, separated from the light oil, and recovered.

Generally it is desirable that the overall oil separation and deoiling steps yield enough oil for reuse in the dehydration step so that the process will be self-sufficient with respect to light fluidizing oil requirements. Even more desirably, in some cases such as when the aqueous solids initially contain a light oil, the combined oil separation and deoiling steps will generate somewhat more light oil than is needed for the dehydration step so that the process will provide a net oil yield. Also, if the aqueous solids initially contain a heavy oil, this may be extracted by the light fluidizing oil and recovered as set forth above.

No matter how vigorous the separation, e.g., pressing, of the essentially anhydrous slurry of solids in light oil, the recovered solids will have sorbed thereon appreciable quantities of light oil which, if not recovered, will be lost to the process. The liquid-solid separating means to separate the light fluidizing oil from the solids may be, for example, a settling tank where separation occurs by gravity. Alternatively, separation may be by means of a mechanical press of the static variety, e.g., a reciprocating filter press, or, more advantageously, by means of a dynamic separating device such as a centrifuge. However, both static and dynamic presses may be used. Accordingly, most of the light oil is pressed from the solids in, for example, a centrifuge, and the oil may be collected in a suitable reservoir where it is available for reuse in the process if so desired. If the aqueous solids originally contain a heavy oil, it may be separated from the essentially anhydrous solids due to extraction by the light fluidizing oil during the liquid-solid separating step. If the separated oil is divided into its light oil and heavy oil components and only the light oil component recycled as fluidizing oil the net result is a reduction in the heavy oil content of the dry solids. On the other hand, if the gross separated oil comprised of light fluidizing oil and extracted heavy oil is recycled as the fluidizing oil, an equilibrium is attained wherein heavy oil is put back into the dry solids at the same rate it is removed by the recycled gross fluidizing oil. The net result is essentially dry solids having substantially the same heavy oil content on a moisture-free basis as the original feed.

The essentially anhydrous solids having oil sorbed thereon may then be advantageously brought into direct contact with a blowing gas such as blowing steam. The blowing steam, if superheated, supplies latent heat for the evaporation of the light oil or, alternatively, saturated blowing steam at about 212° F. may be used in conjunction with external heat as from a steam jacket to supply heat for evaporation of the light oil. Since the light oil is water-immiscible, its direct contact with the blowing steam amounts essentially to a steam distillation wherein the light oil boils at a temperature below its normal boiling point. Thus, not only is the light oil more readily evaporated from the solids with less heat energy being required from the blowing steam alone or in conjunction with an extraneous heat source such as indirect thermal contact with steam or another heat transfer fluid in, for example, a steam jacket, but it makes possible the use of higher boiling light oils. Any heavy oil remaining on the dry solids, however, is essentially not evaporated.

In certain applications such as deoiling of temperature-sensitive materials like food products for human consumption and animal feeds, even lower temperatures for evaporation of the light oil are desired. This may be accomplished by contacting the oil-laden solids with blowing gas at less than atmospheric pressure or at atmospheric pressure employing lower blowing gas temperatures.

The removal of light oil from the solids by direct contact with a blowing gas such as blowing steam may conveniently take place in a deoiler apparatus which may advantageously be connected to the discharge of the pressing apparatus, e.g., a centrifuge, and which may be operated at atmospheric or less than atmospheric pressure. If desired, the deoiler apparatus may be externally heated as by means of a steam jacket. Blowing gas is passed into the deoiler apparatus containing the oil-laden solids. The vaporized light oil is eventually condensed and reused in the dehydration process. Any heavy oil present on the solids is essentially not evaporated.

The solids left after removal of the light oil therefrom by direct contact with blowing gas may often be utilized for purposes outside the process itself and thus constitute a process product. The process and apparatus of this invention may be used to recover clean water and essentially dry solids from aqueous solids derived from numerous sources whether they be waste solids or solids having intrinsic value. Thus, for example, this invention finds utility in the recovery of water and solids from a variety of materials which are found in aqueous solution, in water dispersion or otherwise associated with water, e.g., powdered coal, food products, animal feeds and wastes, cement, spent lime, inorganic salts, sewage, sewage sludge, slaughter house effluent and rendering materials, slimes, black liquors from the paper industry, certain tree barks, the organic streams from garbage disposal plants, pharmaceutical products and wastes, cannery or canning factory effluent, chemicals, etc.

Thus, depending on the source, the solids recovered from the blowing gas contacting operation may be used as fertilizer, as animal feed, or possibly as food for human consumption, e.g., a dehydrated, fat-free food product. Further, since they are often burnable, they may be used as fuel in the boiler-furnace component of the apparatus for the generation of steam needed to supply heat to the system, hot inert blowing gas or blowing steam for contacting the oil-laden solids, and also the steam needed to run auxiliary equipment such as pumps and compressors, either directly if they be steam driven or indirectly if they be motor driven and the steam is used to run a turbogenerator directly. Any heavy oil remaining on the essentially dry solids also may have fuel value. The process may thus be at least partially self-sufficient in respect of fuel requirements. The process and apparatus of this invention thus provide means for the recovery of essentially clean water and valuable solids products from aqueous solids. Furthermore, this invention is characterized by the use of a plurality of mechanical vapor recompression evaporators in staged array and by the conservation of energy through the use of heat exchangers whereby hot light oil and hot water condensates formed in the evaporation step give up their heat to the feed to the mechanical vapor recompression evaporator array.

The material to be treated by the process of this invention should contain solids particles generally smaller than about ¼ inch. However, larger particles are acceptable, as in the case of bone for gelatin manufacture, provided that the clearances between heat transfer surfaces be increased accordingly. Larger particles may be ground to size or comminuted by existing techniques.

The light oils that are utilized for admixture with the aqueous solids prior to the dehydration operation are inert and water-immiscible. In addition, they should be sufficiently volatile to be evaporated by direct contact with a blowing gas such as blowing steam at a temperature within the range of from about 70° F. to about 400° F. Generally, light oils boiling within the range of from about 150° F. to about 550° F., and preferably from about 300° F. to about 450° F., are contemplated as being useful for this purpose. Light oils such as hydrocarbon oils boiling within the range of from about 325° F. to about 400° F. are particularly preferred in the processing of animal feeds and food products for human consumption since this boiling range permits almost complete removal of the oil from the dry solids product. The usually preferred class of light oil is light hydrocarbon oil. The light hydrocarbon oil may be normal paraffinic, isoparaffinic, aromatic, or naphthenic. Examples of suitable light hydrocarbon oils are n-pentane, isopentane, n-hexane, cyclohexane, benzene, isooctane, eicosane, petroleum fractions boiling in the range of from about 300° F. to about 450° F., isohexane, xylene, octadecane, toluene, n-heptane, cyclopentane, and mixtures thereof. Another class of suitable light oils is water immiscible fatty alcohols. Examples of suitable alcohols are n-hexyl alcohol, n-heptyl alcohol, isoheptyl alcohol, n-octyl alcohol, isooctyl alcohol, n-nonyl alcohol, and n-decyl alcohol. Fatty acids such as caproic acid and capric acid and their esters may also be used as the light oil.

In processing food products and animal feed, a federal Food and Drug Administration (FDA) approved light oil such as the series of isoparaffinic oils manufactured by Humble Oil and Refining Company under the trademark "Isopar" may be used. Particularly preferred in processing animal feeds and food products for human consumption is Isopar H because its flash point permits safe operation and its boiling temperature, which is within the range of about 325° F. to 400° F., allows for almost complete removal of the oil from the dried food product, thereby complying with FDA regulations. Generally, materials that are liquid at the temperature of operation, that are preferably oil-like and that are relatively volatile and essentially immiscible with water may be employed. It is often desirable to employ a light oil that imparts process credits, i.e., one that can add value to the solids product, such as waste oils normally found in sewage or industrial waste, or fuel oils, or, as suggested above, employ oils derived in the practice of the process itself so as to minimize cost factors. The quantity of light fluidizing oil is such that its ratio in the system is in the range of about 2 to about 20 parts or more by weight, based on each part of non-fat or non-oil based solids. This refers to total oil, i.e., that added plus that derived from the process for reuse. This amount of oil gives a fluid, pumpable mixture even in the absence of water. The term "fluid" as used herein is intended to be synonomous with "liquid," i.e., taking the shape of the container to the extent that the mixture fills the container.

The dehydration step of this invention is carried out in a plurality of mechanical vapor recompression evaporators operating in staged array, i.e., operating in sequence. Mechanical vapor recompression evaporators are very efficient and their use requires very little steam for direct heating. They are particularly efficient when drying low solids streams, typically requiring less than about 200 BTU's per pound of water evaporated. In a mechanical vapor recompression evaporator system, vapor is taken out of the vapor chamber of the evaporator and compressed into steam which is used to drive the same evaporator. A blower-type compressor typically approximately doubles the pressure of the vapor before pushing it into the evaporator's heat exchangers, although compression ratios both higher and lower may be employed.

The practice of this invention requires very little steam for direct heating. The feed stream to the mechanical vapor recompression evaporator array is preheated in heat exchangers by hot water and hot light fluidizing oil condensates resulting from evaporation of the light oil-aqueous solids mixture as well as by the direct addition of hot light oil resulting from said evaporation. The system is, therefore, very heat efficient.

Some of the advantages of using a plurality of mechanical vapor recompression evaporators in staged array are that the aqueous solids are concentrated beyond the point where addback solids are usually needed to maintain dispersion of the aqueous solids in the fluidizing oil as disclosed in U.S. Pat. No. 31,185; concentration of aqueous solids is achieved with the expenditure of only a relatively small amount of energy; water is evaporated by the use of direct mechanical energy which can be obtained, for example, from a topping turbine; concentration is achieved at low temperatures; and the use of single stage mechanical vapor recompression evaporators in sequence reduces the recompression needed to maintain equilibrium.

While the dehydration step may be carried out in a single mechanical vapor recompression evaporator, it is advantageous that that step be accomplished in accordance with the practice of this invention, that is, in a plurality of mechanical vapor recompression evaporators in sequence wherein each of the successive evaporation steps in later stages of the mechanical vapor recompression evaporator array is at a successively higher concentration, i.e., the resulting solids are increasingly dehydrated. Thus the plurality of evaporation steps connotes at least two sequential steps.

The justification of operating with a plurality of mechanical recompressors, in an evaporative system where the object is ultimately dehydration, is the conservation of energy. Persons experienced in the art are familiar with the problem of boiling point rise, as concentration is increased. This ultimately appears as lost energy in attempting to compress the vapors which are subject to this boiling point rise, i.e., more work required.

The following summary illustrates that phenomenon, and is based on evaporation of 1,000 pounds of water per hour in a single stage evaporator with a light transport oil (fluidizing oil). The product temperature in all cases on the suction side is 180° F., and the compressed vapors (oil and water) have a dew point of 190° F. The variable is the degree of concentration of the solids expressed as a percentage.

| % Concentration* | Boiling Point Rise | Compression Ratio | Theoretical HP |
|---|---|---|---|
| 40 | 12° F. | 1.612 | 14.7 |
| 60 | 14° F. | 1.684 | 16.1 |
| 80 | 18° F. | 1.839 | 19.15 |
| 90 | 27° F. | 2.247 | 25.83 |
| 95 | 55° F. | 4.264 | 69.57 |

*Concentration on an oil-free basis noted as: $\frac{\text{pounds solids} \times 100}{\text{pounds solids} + \text{pounds water}}$ The temperatures, pressures and concentrations in each of the sequential series of evaporator steps are largely empiric in nature, depending upon the oils, solids and systems being employed. The typical processing temperatures for the dehydration of the light fluidizing oil-aqueous solids mixture may be in the range of about 70° F. to about 225° F. in the first stage and in the range of about 100° F. to about 300° F. in the second, third, or final stages of a multiple sequence of mechanical vapor recompression evaporators. The preferred processing temperatures are in the range of about 100° F. to about 200° F. in the first stage and in the range of about 150° F. to about 250° F. in the second, third or last stages of a multiple sequence of mechanical vapor recompression evaporators.

The pressures within the evaporators are controlled with temperatures to achieve the desired evaporation rates in a given design. The normal pressure in the vapor chamber of the first stage of a sequential mechanical vapor recompression evaporator system may be in the range of about 4 to about 15 inches Hg absolute while the normal pressures in the condensing region, i.e., the energy supply side, of the first stage may be in the range of about 8 to about 20 inches Hg absolute. The preferred pressures in the vapor chamber of the first stage of a sequential mechanical vapor recompression evaporator system may be in the range of about 6 to about 10 inches Hg absolute while the preferred pressures in the condensing region of the first stage may be about 10 to about 15 inches Hg absolute. The normal pressures in the vapor chambers of the second, third or final stages of a multiple sequence of mechanical vapor recompression evaporators may be in the range of about 4 to about 15 inches Hg absolute while the normal pressures in the condensing regions of the second, third or final stages may be in the range of about 20 to about 35 inches Hg absolute. The preferred pressures in the vapor chambers of the second, third or final stages of a multiple sequence of mechanical vapor recompression evaporators is in the range of about 6 to about 10 inches Hg absolute while the preferred pressures in the condensing regions of the second, third or final stages may be in the range of about 24 to about 30 inches Hg absolute.

The advantage of the sequential evaporation steps may be seen from the following. For example, a feed comprising 90 parts by weight of water and 10 parts by weight of solids mixed with a light fluidizing oil at a temperature of 160° F. is conducted to the first of two sequential mechanical vapor recompression evaporators. The pressure in the vapor chamber of the first mechanical vapor recompression evaporator stage is about 7.12 inches Hg absolute. A mixed vapor comprising about 90% by weight of the water in the original feed and a portion of the light fluidizing oil is withdrawn from the vapor chamber of the first mechanical vapor recompression evaporator, compressed to steam at a temperature of about 170° F. (dewpoint) and a pressure of about 12.75 inches Hg absolute and returned to the condensing region of the first mechanical vapor recompression evaporator stage to supply evaporative heat to the side or region in flow communication with the vapor chamber. A stream comprising about 10 parts by weight of water and 10 parts by weight of solids mixed with the remainder of the light fluidizing oil is withdrawn from the first stage of the mechanical vapor recompression evaporator and conducted to the second stage of the mechanical vapor recompression evaporator array.

A mixed vapor comprising the remainder of the water and part of the light fluidizing oil at a temperature of about 195° F. and a pressure of about 7.74 inches Hg absolute is withdrawn from the vapor chamber of the second sequential mechanical vapor recompression evaporator, compressed to steam at a temperature of about 205° F. (dewpoint) and a pressure of about 27.6 inches Hg absolute and returned to the condensing region of the second mechanical vapor recompression evaporator stage to supply evaporative heat. A stream of essentially anhydrous solids in light fluidizing oil is withdrawn from the second mechanical vapor recompression evaporator stage and subsequently separated into essentially dry solids and light oil. Thus, an aqueous solids stream comprising 90 parts by weight of water and 10 parts by weight of solids may be concentrated to 50% by weight of solids and 50% by weight of water in the first of two sequential mechanical vapor recompression evaporators and taken essentially to dryness in the second mechanical vapor recompression evaporator stage. Moreover, the evaporation is carried out at relatively low temperatures with the expenditure of only relatively small amounts of energy, most of which is mechanical energy.

Figure 1B:
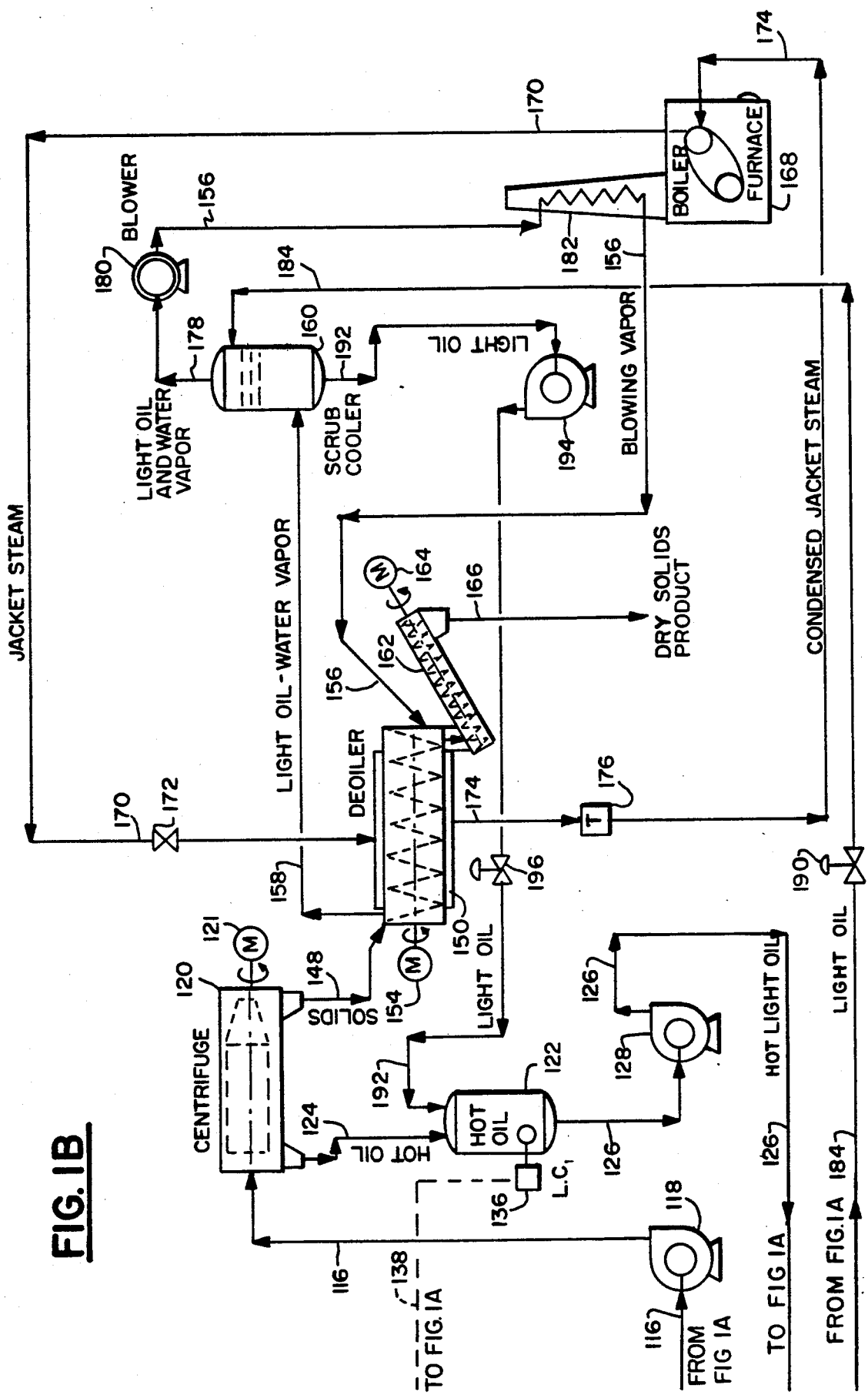

The invention will be most clearly perceived and best understood through reference to the preferred embodiment as discussed in further detail in connection with the flow diagram shown in FIG. 1A and FIG. 1B of the drawings. In the embodiment illustrated in FIG. 1A and FIG. 1B of the drawings, a stream of aqueous solids in solution or dispersion enters progressive cavity pump 10 through line 12. Progressive cavity pump 10, designed for metered feeding, is actuated by motor 14. The stream of aqueous solids is conducted from progressive cavity pump 10 through line 16 to heat exchanger 18. Aqueous solids are preheated to about 160° F. by hot condensed water product obtained in the process which enters heat exchanger 18 through line 20 and is discharged through line 22 to storage or use in the system. Preheated aqueous solids are conducted from heat exchanger 18 to line mixer 24 through line 26. Light fluidizing oil is conducted to the preheated aqueous solids in line 26 through line 28 which is connected to line 26 by a "T" joint. The mixture of light oil and aqueous solids is blended in line mixer 24 which is powered by motor 30. The mixture of light oil and aqueous solids is conducted from line mixer 24 to the evaporating region of first stage mechanical vapor recompression evaporator 32 through line 34 with the assistance of circulating pump 36 which is located thereon. A mixed vapor of light oil and water at a temperature in the range of about 70° F.-225° F. and preferably about 100° F.-200° F., and at a pressure in the range of about 4-15 inches Hg absolute and preferably about 6-10 inches Hg absolute is withdrawn from the vapor chamber of mechanical vapor recompression evaporator 32 through line 38 and conducted to compressor 40.

The mixed vapor of light oil and water is compressed in compressor 40 to steam at a temperature within the range of about 70° F.-225° F. and preferably about 100° F.-200° F., and a pressure within the range of about 8-20 inches Hg absolute and preferably about 10-15 inches Hg absolute. The mixed vapor is conducted from compressor 40 to the condensing region of first stage mechanical vapor recompression evaporator 32 through line 42. A mixed vapor of water and light oil plus non-condensables is conducted through line 44 from first stage mechanical vapor recompression evaporator 32 to water-cooled condenser 46. That stream conveys or is characterized by energy developed by compressor 40 in excess of that required for thermal balance in the system and so, in effect, represents an excess energy vent. The flow of mixed vapor and non-condensables through line 44 is controlled by valve 48 which is located thereon. A mixed light oil-water condensate is withdrawn from first stage mechanical vapor recompression evaporator 32 through line 50 and discharged into oil-water separator 56.

Partially dehydrated aqueous solids in light fluidizing oil are withdrawn from first stage mechanical vapor recompression evaporator 32 and conducted through line 58 to line mixer 24 where they are blended with fresh aqueous solids in light fluidizing oil and discharged into line 34. A portion of the aqueous solids in light oil circulating in line 34 is diverted into line 60 which is connected to line 34 by a "T" joint. Pump 62, which is disposed on line 60, discharges the light oil-aqueous solids mixture into heat exchanger 64 from which the mixture is conducted via line 66 to heat exchanger 68. The heated mixture of aqueous solids in light fluidizing oil is conducted from heat exchanger 68 to line 70 through line 72 which is connected thereto by a "T" joint. Pump 74 on line 70 urges the light oil-aqueous solids mixture into the evaporating region of second stage mechanical vapor recompression evaporator 76. A mixed vapor of light oil and water at a temperature in the range of about 100° F.-300° F. and preferably at about 150° F.-250° F., and at a pressure in the range of about 4-15 inches Hg absolute and preferably about 6-10 inches Hg absolute is withdrawn from the vapor chamber of mechanical vapor recompression evaporator 76 through line 78 and conducted to compressor 80. The mixed vapor of light oil and water is compressed in compressor 80 to steam at a temperature within the range of about 100° F.-300° F. and preferably about 150° F.-250° F., and a pressure within the range of about 20-35 inches Hg absolute and preferably about 24-30 inches Hg absolute.

The mixed steam is conducted from compressor 80 to the condensing region of second stage mechanical vapor recompression evaporator 76 through line 82. An excess energy vent stream comprising a mixed vapor of water and light oil plus non-condensables is conducted through line 84 from second stage mechanical vapor recompression evaporator 76 to line 44, to which it is connected by a "T" joint, and subsequently to water-cooled condenser 46. The flow of mixed vapor and non-condensables through line 84 is controlled by valve 86 which is located thereon. A mixed light oil-water condensate is withdrawn from water-cooled condenser 46 and conducted via line 88 to oil-water separator 56.

Sub-cooled non-condensables are conducted from water-cooled condenser 46 to vacuum pump 90 through line 94 and released from vacuum pump 90 to the atmosphere via line 96.

A hot mixed oil-water condensate is withdrawn from the condensing region of mechanical vapor recompression evaporator 76 and conducted to tank 98 through line 100. The hot mixed oil and water condensate is withdrawn from tank 98 through line 102 and urged by pump 104, which is located thereon, to the shell side of heat exchanger 64 where it gives up its heat to the oil-aqueous solids mixture in heat exchanger 64. The cooled oil-water condensate is then conducted from the shell side of heat exchanger 64 to oil-water separator 56 via line 106. The flow of cooled oil-water condensate through line 106 is controlled by valve 108 which is located thereon. Valve 108 is regulated by level control 110 on tank 98 via signal transmitting means 112. Thus, level control 110 controls the level of hot condensate derived from the shell side of the second stage mechanical vapor recompression evaporator, thereby allowing the use of said hot condensate at the same rate for the preheating of feed to the second stage mechanical vapor recompression evaporator as condensate is produced in the second stage mechanical vapor recompression evaporator.

A mixture of hot substantially dry solids in light fluidizing oil is withdrawn from second stage mechanical vapor recompression evaporator 76 and conducted by line 114 to pump 74. The mixture of hot substantially dry solids in light fluidizing oil is discharged from pump 74 through line 70 and a portion thereof recycled to the evaporating region of second stage mechanical vapor recompression evaporator 76. A portion of the mixture of hot substantially dry solids in light fluidizing oil is diverted into line 116, which is connected to line 70 by a "T" joint. Pump 118, which is located on line 116, urges the mixture of hot substantially dry solids in light fluidizing oil to centrifuge 120 where the substantially dry solids are separated from the hot light fluidizing oil. Centrifuge 120 is actuated by motor 121.

Hot fluidizing oil is conducted from centrifuge 120 to oil tank 122 through line 124. Hot fluidizing oil is withdrawn from tank 122 through line 126 and urged by pump 128, which is located thereon, to the shell side of heat exchanger 68 where it gives up its heat to the mixture of aqueous solids in light fluidizing oil in heat exchanger 68. The cooled light fluidizing oil is conducted from the shell side of heat exchanger 68 through line 28, which is connected to line 26 by a "T" joint. The light fluidizing oil becomes mixed with aqueous solids feed in line 26. The flow of light fluidizing oil through line 28 is controlled by valve 134, which is located thereon. Valve 134 is regulated by level control 136 on oil tank 122 via signal transmitting means 138.

Hot condensed water product is withdrawn from oil-water separator 56 through line 20 and urged by pump 140, which is located thereon, to the shell side of heat exchanger 18 where it gives up its heat to aqueous solids in heat exchanger 18. Cooled water product is discharged from the shell side of heat exchanger 18 through line 22 to storage or use in the system. The rate of flow of water product through line 22 is controlled by valve 142, which is located thereon. Valve 142 is regulated by level control 144 on oil-water separator 56 via signal transmitting means 146.

Substantially dry solids having residual light fluidizing oil sorbed thereon are discharged from centrifuge 120 and conducted by line 148 to deoiler apparatus 150 which is actuated by motor 154. The substantially dry solids are there directly contacted with blowing gas, in this instance steam and residual light oil vapor, which is conducted into deoiler apparatus 150 through line 156. The residual light oil on the solids is vaporized and a mixed light oil-water vapor is conducted from deoiler apparatus 150 via line 158 to direct contact scrub cooler 160. Substantially dry solids that are essentially free from residual light fluidizing oil are discharged from deoiler apparatus 150 into screw conveyor 162 which is actuated by motor 164. The substantially dry and essentially light oil-free solids are discharged from screw conveyor 162 and conducted through line 166 to storage or use. By connections not shown, it is assumed in this instance that blowing gas from a boiler-furnace has been used initially to purge atmospheric gases from the scrubber gas circuit or deoiling loop, and hence at start up that loop is characterized by a water vapor and light oil atmosphere.

Steam generated in boiler-furnace 168 is conducted through line 170 to the steam jacket surrounding deoiler apparatus 150 to supply heat to the deoiling of the substantially dry solids therein. Shut-off valve 172 on line 170 can be used to regulate the flow of jacket steam to deoiler apparatus 150. Condensed jacket steam is withdrawn from the steam jacket surrounding deoiler apparatus 150 through line 174; passed through steam trap 176 which is located on line 174, and returned to boiler-furnace 168 to be recycled as jacket steam.

Cooled vapors, their temperature having been reduced through direct contact with relatively cool oil, are conducted from scrub cooler 160 through line 178 to blower 180. From that blower they are discharged through line 156 which passes through stack 182 of boiler-furnace 168, and as heated or reheated they are conducted through line 156 to deoiler apparatus 150 to act as superheated blowing gas therein providing latent heat of vaporization to the light oil to be removed.

Light, relatively cool fluidizing oil is withdrawn from oil-water separator 56 through line 184 and urged by pump 188, which is located thereon, to scrub cooler 160. Valve 190, which is located on line 184, controls the flow rate of light fluidizing oil through line 184. Within the scrub cooler, that oil contacts and cools the vapors entering through line 158, condensing at least the vapor of oil removed from the solids.

Light oil, somewhat rewarmed, is withdrawn from scrub cooler 160 through line 192 and urged by pump 194, which is located thereon, to tank 122 where it is combined with hot oil and recycled through the system. The rate of flow of light oil through line 192 is controlled by valve 196, which is located thereon.

Since the flow diagram as shown in the drawing has been discussed above in connection with the dehydration in a mechanical vapor recompression evaporator array and subsequent deoiling of aqueous solids generally, it will be understood by those skilled in the art that the instant invention may be used to advantage in the dehydration in an oil medium of aqueous waste solids and aqueous solids having intrinsic value. Examples of such aqueous solids are sewage sludge, slaughterhouse effluent and rendering material, inorganic salts, pharmaceutical products, certain tree barks, the organic streams from garbage disposal plants, various aqueous chemicals and mixtures thereof, animal feeds, and food products for human consumption.

Thus, the instant invention provides process and apparatus for recovering solids and clean water from aqueous solids dehydrated in a light, water-immiscible fluidizing oil medium. The invention is characterized by the use of a plurality of mechanical vapor recompression evaporators in staged array and by the conservation of energy through the use of heat exchangers whereby hot light oil and water condensates give up their heat to the feed to the mechanical vapor recompression evaporators. Aqueous solids are admixed with a low viscosity, relatively volatile, water-immiscible light fluidizing oil and the mixture subjected to a dehydration step by means of a plurality of mechanical vapor recompression evaporators to remove substantially all of the water and part of the light oil. Thus, most of the evaporation is achieved by the use of direct mechanical energy. The remainder of the light fluidizing oil is then largely separated from the solids. Residual fluidizing oil may be removed from the solids by jacket heating and hot gas stripping.

While a specific embodiment of the present invention has been shown and described in detail to illustrate the utilization of the inventive principles, it is to be understood that such showing and description have been offered only by way of example and not by way of limitation. Protection by Letters Patent of this invention in all its aspects as the same are set forth in the appended claims is sought to the broadset extent that the prior art allows.

We claim as our invention:

1. A process for the recovery of clean water and substantially dry, fluidizing oil-free solids from aqueous solids dehydrated in a light fluidizing oil medium, said process comprising the steps of (1) admixing aqueous solids with a low viscosity, relatively volatile, water-immiscible light fluidizing oil to obtain a mixture which will remain fluid and pumpable after removal of the water content therefrom; (2) subjecting the resultant oil-containing mixture to dehydration by means of a plurality of mechanical recompression evaporators operating in staged array comprising at least a first stage and a last stage whereby part of the water and part of the light fluidizing oil are vaporized in the first stage and substantially all the water and part of the light fluidizing oil are vaporized by the last stage, yielding a mixed water and light oil vapor and a substantially anhydrous solids in oil slurry; (3) condensing the resultant mixed water and light oil vapors to form a hot mixed condensate; (4) separating the resultant hot mixed condensate into a hot clean water fraction and a hot light oil fraction, and (5) separating at least some of the relatively volatile, water-immiscible light fluidizing oil from said substantially anhydrous solids in oil slurry, energy derived from the hot clean water fraction of step (4) being used to preheat the aqueous solids prior to admixture with said low viscosity, relatively volatile, water-immiscible light fluidizing oil and prior to the first stage of dehydration step (2), and energy derived from the hot mixed condensate of step (3) and the hot light oil fraction of step (4) being used to preheat the mixture of partially dehydrated aqueous solids in light fluidizing oil discharged from the first stage of dehydration step (2) prior to subsequent stages of dehydration step (2).

2. The process of claim 1 wherein the substantially anhydrous solids in oil slurry of step (2) is grossly de-oiled and the resultant solids carrying residual light fluidizing oil are brought into direct contact with a blowing gas to thereby remove said residual light fluidizing oil from said substantially anhydrous solids by heat evaporation.

3. The process of claim 2 wherein said blowing gas is steam.

4. The process of claim 1 wherein mechanical vapor recompression evaporation step (2) is carried out at temperatures within the range of from about 70° F. to about 300° F.

5. The process of claim 4 wherein mechanical vapor recompression evaporation step (2) is carried out using two single stage mechanical vapor recompression evaporators in sequence.

6. The process of claim 2 wherein said solids carrying residual light fluidizing oil are brought into direct contact with blowing gas at a temperature within the range of from about 70° F. to about 400° F.

7. The process of claim 3 wherein said solids carrying residual light fluidizing oil are brought into direct contact with blowing steam at a temperature within the range of from about 70° F. to about 400° F.

8. The process of claim 3 wherein said solids carrying residual light fluidizing oil are brought into direct contact with superheated blowing steam.

9. The process of claim 1 wherein said light fluidizing oil is a hydrocarbon oil boiling in the range of from about 325° F. to about 400° F.

10. The process of claim 9 wherein said light hydrocarbon fluidizing oil is Isopar H.

11. The process of claim 1 wherein the aqueous solids subjected to dehydration are originally associated with a heavy, relatively non-volatile oil, said heavy oil being extracted from said solids by said light fluidizing oil in liquid-solid separating step (5) whereby recycling of the gross separated oil as fluidizing oil causes establishment of an equilibrium wherein heavy oil is replaced in said aqueous solids at substantially the same rate as that at which it is extracted.

12. An apparatus for recovering clean water and substantially dry fluidizing oil-free solids from aqueous solids dehydrated in a light fluidizing oil medium, said apparatus comprising (1) a conveyor for aqueous solids; (2) a light fluidizing oil reservoir; (3) means for transmitting light fluidizing oil from said light fluidizing oil reservoir to a stream of aqueous solids discharged from said conveyor to form a mixture; (4) a plurality of mechanical vapor recompression evaporators operating in staged array comprising at least a first stage and a last stage; (5) means for transmitting a stream of aqueous solids admixed with light fluidizing oil into the evaporating region of the first stage of said mechanical vapor recompression evaporator array whereby said aqueous solids become partially dehydrated; (6) means for transmitting the partially dehydrated stream of aqueous solids in light fluidizing oil from the first stage of said mechanical vapor recompression evaporator array to the evaporating region of a later stage of the mechanical vapor recompression evaporator array; (7) an oil-water separating means; (8) conduits extending from said mechanical vapor recompression evaporator array to said oil-water separating means wherethrough may flow a mixed condensate of water and light oil formed in said mechanical vapor recompression evaporator array; (9) means for separately withdrawing light oil and clean water from said oil-water separating means; (10) a liquid-solid separating means; (11) a conduit extending from the last stage of said mechanical vapor recompression evaporator array to said liquid-solid separating means wherethrough may flow a stream of a slurry of substantially anhydrous solids in light fluidizing oil; (12) a deoilder means; (13) a conduit extending from said liquid-solid separating means to said deoiler means wherethrough may flow a stream of residually oil-laden substantially anhydrous solids, and (14) a combustion apparatus associated with said deoiler means for supplying at least a portion of the evaporative heat thereto by indirect heat transfer, and blowing gas to come into direct contact with said residually oil-laden substantially anhydrous solids in said deoiler means, there being substantially closed circuit containment means for the flow of said blowing gas, that means including serially (i) heat transfer means disposed in said combustion apparatus, (ii) said deoiler means and (iii) a scrub cooler.

13. An apparatus for recovering clean water and substantially dry, fluidizing oil-free solids from aqueous solids dehydrated in a light fluidizing oil medium, said apparatus comprising (1) a conveyor, including a heat exchanger, for aqueous solids; (2) a light fluidizing oil reservoir; (3) means for transmitting light fluidizing oil from said light fluidizing oil reservoir to a stream of aqueous solids discharged from said conveyor to form a mixture; (4) a blender; (5) means for transmitting the mixture of light fluidizing oil and aqueous solids to said blender whereby said light fluidizing oil and said aqueous solids may become thoroughly mixed; (6) a plurality of mechanical vapor recompression evaporators operating in staged array comprising at least a first stage and a last stage; (7) means for transmitting a stream of aqueous solids admixed with light fluidizing oil from said blender into the evaporating region of the first stage of said mechanical vapor recompression evaporator array whereby said aqueous solids become partially dehydrated; (8) means including a heat exchanger for transmitting the partially dehydrated stream of aqueous solids in light fluidizing oil from the first stage of said mechanical vapor recompression evaporator array to the evaporating region of a later stage of the mechanical vapor recompression evaporator array; (9) means for transmitting at least a portion of hot light oil condensate formed in said later stage of the mechanical vapor recompression evaporator array from said later stage of the mechanical vapor recompression evaporator array to the heat exchanger of said means for transmitting the partially dehydrated stream of aqueous solids in light fluidizing oil from the first stage of the mechanical vapor recompression evaporator array to the evaporating region of said later stage of the mechanical vapor recompression evaporator array whereby said partially dehydrated stream of aqueous solids in light fluidizing oil is heated further prior to transmittal to said later stage of the mechanical vapor recompression evaporator array; (10) an oil-water separating means; (11) conduits extending from said mechanical vapor recompression evaporator array, and from the heat exchanger of said means for transmitting the partially dehydrated stream of aqueous solids in light fluidizing oil, to said oil-water separating means wherethrough may flow a mixed condensate of water and light oil; (12) means for separately withdrawing light oil from said oil-water separating means; (13) means for separately withdrawing hot clean water from said oil-water separating means and conducting it to the heat exchanger in the conveyor for aqueous solids to thereby raise the temperature of said aqueous solids; (14) a liquid-solid separating means; (15) a conduit extending from the last stage of said mechanical vapor recompression evaporator array to said liquid-solid separating means wherethrough may flow a stream of a slurry of substantially anhydrous solids in light fluidizing oil; (16) a deoiler means; (17) a conduit extending from said liquid-solid separating means to said deoiler means wherethrough may flow a stream of residually oil-laden substantially anhydrous solids, and (18) a combustion apparatus associated with said deoiler means for supplying at least a portion of evaporative heat thereto by indirect heat transfer, and blowing gas to come into direct contact with said residually oil-laden substantially anhydrous solids in said deoiler means.

14. The apparatus of claim 13 wherein the mechanical vapor recompression evaporator array comprises two single stage mechanical vapor recompression evaporators in sequence.

15. The apparatus of claim 13 wherein said combustion apparatus associated with said mechanical vapor recompression evaporator and said deoiler means comprises a boiler-furnace for the generation of steam and wherein further there are conduit means extending from said boiler-furnace to said deoiler means wherethrough heating jacket steam and blowing steam may flow from said boiler-furnace to said deoiler means.

* * * * *

UNITED STATES PATENT AND TRADEMARK OFFICE
CERTIFICATE OF CORRECTION

PATENT NO. : 5,076,895

DATED : December 31, 1991

INVENTOR(S) : Charles Greenfield (deceased)

It is certified that error appears in the above-identified patent and that said Letters Patent is hereby corrected as shown below:

Col. 9, line 35: between "No." and "31,185" insert --Re.--.

Col. 15, line 28: change "broadset" to --broadest--.

Col. 15, line 40 (Claim 1, line 10): between "mechanical" and "recompression" insert --vapor--.

Col. 17, line 3 (Claim 12, line 33): change "deoilder" to --deoiler--.

Signed and Sealed this

Twentieth Day of April, 1993

*Attest:*

MICHAEL K. KIRK

*Attesting Officer*      *Acting Commissioner of Patents and Trademarks*